(12) United States Patent
Garing et al.

(10) Patent No.: US 9,995,336 B2
(45) Date of Patent: Jun. 12, 2018

(54) FRICTION BUSHING

(71) Applicant: B/E AEROSPACE, INC., Wellington, FL (US)

(72) Inventors: Francis Xavier Garing, Atlanta, GA (US); Benjamin D. Stephens, Atlanta, GA (US); Mark A. Kruse, Atlanta, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 67 days.

(21) Appl. No.: 15/274,142

(22) Filed: Sep. 23, 2016

(65) Prior Publication Data

US 2017/0009804 A1    Jan. 12, 2017

Related U.S. Application Data

(63) Continuation-in-part of application No. 14/661,128, filed on Mar. 18, 2015.

(60) Provisional application No. 61/954,876, filed on Mar. 18, 2014.

(51) Int. Cl.
| F16D 63/00 | (2006.01) |
| F16C 27/02 | (2006.01) |
| B60N 2/68 | (2006.01) |
| B60N 3/00 | (2006.01) |

(52) U.S. Cl.
CPC .............. *F16C 27/02* (2013.01); *B60N 2/682* (2013.01); *B60N 3/004* (2013.01); *F16C 2326/43* (2013.01)

(58) Field of Classification Search
CPC .......... F16H 2049/003; B60G 2204/41; B60G 21/055; B60G 2204/1222; B60N 2/682; B60N 3/004; Y10T 279/17119; Y10T 82/2579; B23B 13/123; B23B 13/125; F16C 29/02; F16C 33/20; F16C 33/04; F16C 27/02; F16C 2326/43; F16C 2326/24; E21B 19/12; E21B 19/10; E21B 19/07; F15B 15/262
See application file for complete search history.

(56) References Cited

U.S. PATENT DOCUMENTS

| 1,538,442 | A |  | 5/1925 | Mann |
| 1,707,218 | A |  | 4/1929 | Butrick |
| 1,983,950 | A |  | 12/1934 | Sheffer |
| 2,071,138 | A |  | 2/1937 | Nolan |
| 2,741,482 | A |  | 4/1956 | Abramoska |
| 3,289,137 | A | * | 11/1966 | Jones ............... H01C 10/24 188/74 |
| 3,366,356 | A | * | 1/1968 | Fisher ............... F16B 9/02 16/2.1 |

(Continued)

*Primary Examiner* — Bradley T King
*Assistant Examiner* — Mahbubur Rashid
(74) *Attorney, Agent, or Firm* — Clements Bernard Walker PLLC (57) ABSTRACT

In a preferred embodiment a friction bushing is configured to rotate a shaft with resistance having a housing with a bore to receive the shaft; a flange plate positioned on the housing around the bore; and a number of flanges that protrude axially from the flange plate to receive the shaft, where the flanges generate a radially-directed force by being flexible from a relaxed radius to a shaft radius of the shaft, and the flanges have internal circumferentially spaced surfaces in contact with an external surface of the shaft having a topology to control the resistance as the shaft rotates in the friction bushing.

10 Claims, 9 Drawing Sheets

(56) References Cited

U.S. PATENT DOCUMENTS

| | | | |
|---|---|---|---|
| 3,643,765 A | 2/1972 | Hanchen | |
| 3,914,061 A * | 10/1975 | Meyer | F16B 9/02 403/197 |
| 4,078,778 A | 3/1978 | Hubweber | |
| 4,208,075 A * | 6/1980 | Templeton | F16C 29/02 384/29 |
| 4,291,598 A * | 9/1981 | Cherry | E21B 19/16 188/77 R |
| 4,564,088 A * | 1/1986 | Takahashi | B23Q 1/28 188/166 |
| 4,646,597 A * | 3/1987 | Louis | B23B 13/123 279/20.1 |
| 4,662,615 A * | 5/1987 | Paton | B60G 17/052 248/562 |
| 4,678,216 A * | 7/1987 | Gregory | B65D 45/345 292/256.69 |
| 5,129,537 A * | 7/1992 | Bordner | B65D 45/345 220/320 |
| 5,884,926 A * | 3/1999 | Muzio | B60G 21/0551 267/189 |
| 6,485,180 B2 * | 11/2002 | Mena | B62D 3/12 384/215 |
| 6,705,813 B2 * | 3/2004 | Schwab | F16B 21/20 411/156 |
| 7,350,628 B2 * | 4/2008 | Adoline | F16F 3/04 188/67 |
| 7,665,747 B2 * | 2/2010 | Arlt | B62D 3/12 280/93.514 |
| 7,731,446 B2 * | 6/2010 | Prause | B60N 2/1615 403/164 |
| 9,163,667 B2 * | 10/2015 | Blase | F16C 33/08 |
| 2005/0110234 A1 * | 5/2005 | Cai | B60G 21/0551 280/124.107 |
| 2009/0110338 A1 * | 4/2009 | Blase | F16C 33/08 384/296 |
| 2011/0070049 A1 * | 3/2011 | Wang | F16B 5/0208 411/372.6 |
| 2011/0169242 A1 * | 7/2011 | Kuroda | B29C 45/14221 280/124.165 |

\* cited by examiner

FRICTION BUSHING

CROSS REFERENCES TO RELATED APPLICATIONS

This application is a continuation-in-part of and claims priority from U.S. application Ser. No. 14/661,128, entitled "Friction Bushing" and filed Mar. 18, 2015, which claims priority from U.S. Provisional Application No. 61/954,876, filed Mar. 18, 2014, the contents of both which are incorporated by reference in their entirety. This application is also related to PCT Application No. US15/21163 entitled "Friction Bushing" and filed Mar. 18, 2015, the contents of which is incorporated by reference in its entirety.

BACKGROUND

Careful and precise articulation of elements in rotation, e.g. a shaft inside a bushing, is often essential for adjustable articulated systems, e.g. aircraft meal trays, adjustable seats, adjustable leg rests, adjustable armrest, bin doors, or the like. Such a demand for careful and precise articulation can be addressed with the ability to exert resistance and/or damping on the elements in rotation.

To this end, conventional apparatuses generating rotary resistance and/or providing torque reduction, e.g. rotary dampers, rotary hinge dampers, or the like, have been adopted. Usually, these conventional apparatuses rely on a viscous fluids encapsulated between a shaft in rotation and a sealed housing affixed to a bushing to generate resistance as the shaft is rotated.

Although such conventional apparatuses are widely used, they present important drawbacks. Notably, such conventional apparatuses lack of reliability as the viscous fluids may leak from the sealed housing or as physical properties of the viscous fluids can change and/or deteriorate rapidly due to temperature and/or pressure fluctuations as it is frequently experienced in aircraft applications. Furthermore, these conventional apparatuses do not provide adjustments, cycling, and/or incremental variations of the resistance exerted on the rotating elements which can be used to carefully and precisely articulate the elements in rotation.

Thus, an apparatus to provide resistance on rotating elements solving the problems of reliability, controllability, and adjustability is desired.

SUMMARY OF THE ILLUSTRATIVE EMBODIMENTS

Accordingly, the present disclosure relates to a friction bushing which overcomes the above-mentioned limitations of reliability, controllability, and adjustability by providing dry surface friction and/or resistance against rotation of the shaft passing through the bushing. The novel friction bushing has use in numerous applications and in particular, in articulation used on aircraft passenger seats to control and adjust the degree of resistance and consequently an amount of force used to raise or lower meal trays, seat backs, leg rests or the like. The friction bushing is additionally useful in controlling the raising and lowering of commercial aircraft overhead storage bins. In this application the disclosed friction bushing is designed so that the resistance is created by friction resulting from pressure against the shaft by a number of flanges projecting off of the bushing along the axial direction of the shaft. The flanges are radially arranged around the shaft to impart resistance at multiple points on the shaft.

In one aspect, the present disclosure relates to a friction bushing that provides constant resistance to relative rotation of a shaft carried in the bushing.

In another aspect, the present disclosure relates to a friction bushing that provides variable resistance to relative rotation of a shaft carried in the bushing.

In another aspect, the present disclosure relates to a friction bushing that provides resistance to relative rotation of the shaft at multiple points around the shaft.

These and other aspects and advantages of the disclosure are achieved by providing a friction bushing for being positioned on a shaft for relative rotation, including a housing having a bore for receiving the shaft, a flange plate positioned on the housing, and a number of flanges carried by the flange plate and adapted for extending axially along radially-spaced apart areas of the shaft for frictionally-engaging axially-extending areas of the shaft.

In some embodiments, an annular clip is provided for being positioned around the flanges for applying radially-directed additional resistance to the flanges.

In some embodiments, a series of lobes extends axially along the shaft that vary the resistance to relative rotation between the shaft and the flanges.

In some embodiments, the flanges are integrally-formed on the flange plate.

In some embodiments, the flanges are integrally-formed on the flange plate and the flange plate is integrally-formed on the housing.

In some embodiments, the flanges include respective enlarged terminal portions.

In some embodiments, the enlarged terminal end portions of the flanges are thicker in a radially-extending direction than non-terminal portions of the flanges.

In some embodiments, six flanges are formed on the flange plate.

In some embodiments, the flanges collectively constitute two-thirds of the circumference of the bore and spaces between the flanges constitute one-third of the circumference of the bore.

In some embodiments, the enlarged terminal portions constitute the outer 25 percent of the length of the flanges.

In some embodiments, an annular clip is provided for being positioned around the flanges for applying radially-directed additional resistance to the flanges.

In some embodiments, a number of radially-outwardly extending lobes extend axially along the shaft to incrementally vary the resistance to relative rotation between the shaft and the flanges.

In another aspect, the present disclosure relates to a friction bushing that is provided for being positioned on a shaft for friction-retarded rotation relative to the shaft, and includes a housing having a bore for receiving the shaft, a flange plate positioned on the housing around the bore, and a number of flanges integrally-formed on the flange plate and adapted for extending axially outwardly from the flange plate and along circumferentially-spaced apart areas of the shaft for frictionally-engaging axially-extending areas of the shaft. Respective enlarged terminal portions are formed on an outer end of each of the flanges.

In another aspect, the present disclosure relates to a friction bushing that is provided for being positioned on a shaft for friction-retarded rotation relative to the shaft, that includes a housing having a bore for receiving the shaft. A flange plate is positioned on the housing around the bore, and a number of flanges are carried by the flange plate and adapted for extending axially outwardly from the flange plate and along circumferentially-spaced apart areas of the shaft for frictionally-engaging axially-extending areas of the shaft. The flanges collectively may constitute two-thirds of the circumference of the bore and spaces between the flanges may constitute one-third of the circumference of the bore. Respective enlarged terminal portions are formed on an outer end of each of the flanges that are thicker in a radially-extending direction than nonterminal portions of the flanges.

In another aspect, the present disclosure relates to a friction bushing that includes a housing having a bore to receive the shaft; a flange plate positioned on the housing around the bore; and a number of flanges that protrude axially from the flange plate to receive the shaft, where the flanges generate a radially-directed force and provides the resistance as the shaft rotates in the friction bushing.

In another aspect, the present disclosure relates to a friction bushing that includes a housing having a bore to receive the shaft; a flange plate positioned on the housing around the bore; and a number of flanges that protrude axially from the flange plate to receive the shaft, where the flanges generate a radially-directed force by being flexible from a relaxed radius to a shaft radius of the shaft, and the number of flanges has internal circumferentially spaced surfaces in contact with an external surface of the shaft having a topology to control the resistance as the shaft rotates in the friction bushing.

In another aspect, the present disclosure relates to a friction bushing that includes a housing having a bore to receive the shaft; a flange plate positioned on the housing around the bore; and a number of flanges that protrude axially from the flange plate to receive the shaft, where the flanges generate a radially-directed force by being flexible from a relaxed radius to a shaft radius of the shaft, and the flanges have internal circumferentially spaced surfaces in contact with an external surface of the shaft having a texture to control the resistance as the shaft rotates in the friction bushing.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where.

DETAILED DESCRIPTION OF ILLUSTRATIVE EMBODIMENTS

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1:
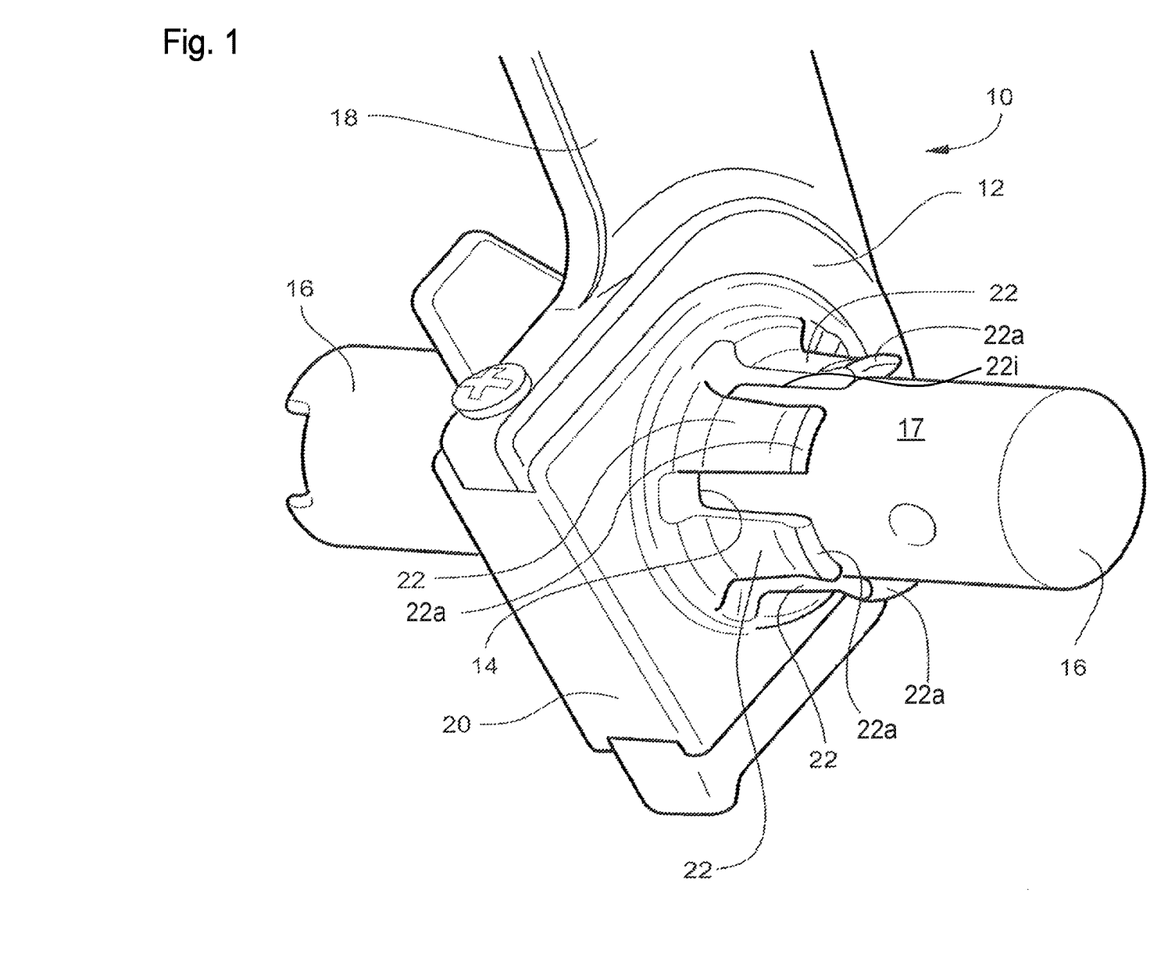
FIG. 1 is a perspective view of a friction bushing with a shaft, according to certain aspects of the disclosure.
Figure 2:
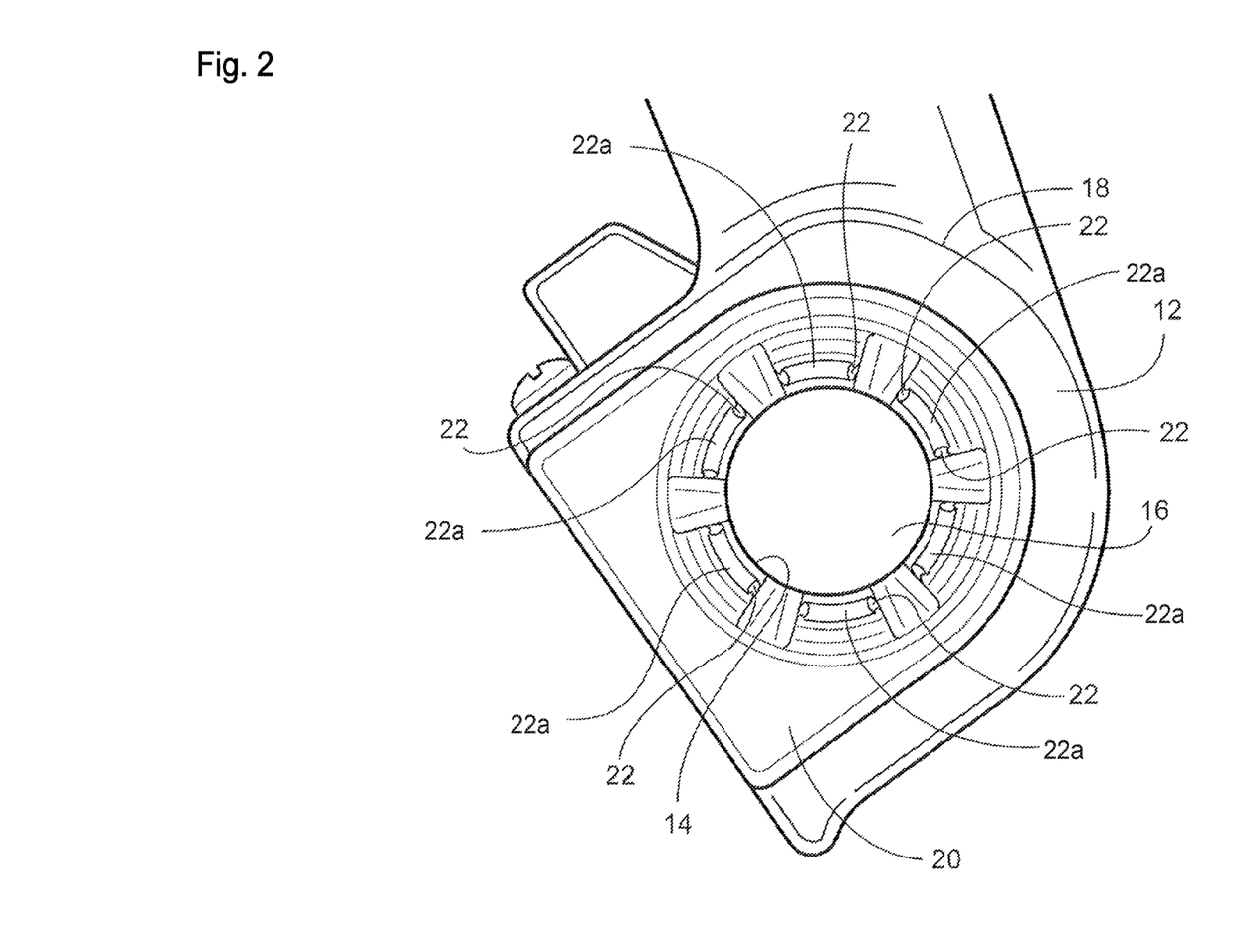
FIG. 2 is an end elevation of the friction bushing, according to certain aspects of the disclosure.

Referring now to FIGS. 1-4, a bushing 10 is shown that includes a housing 12 with a bore 14 through which is positioned a shaft 16. In some embodiments, bushing 10 may operate whereby the housing 12 is stationary and the shaft 16 rotates relative to the housing 12. In other embodiments, and as is illustrated in FIG. 1, the shaft 16 is stationary and the bushing housing 12 rotates relative to the stationary shaft 16.

As shown in FIG. 1, in some embodiments, the housing 12 carries an arm 18 that may be connected to a component such as a meal tray or an overhead storage bin, not shown. The housing 12 may also carry a flange plate 20 positioned circumferentially around the shaft 16. The flange plate 20 may include a series of axially-extending flanges 22 that are sized to engage the shaft 16 in such manner as to retard in a controlled manner the relative rotation of the shaft 16 in the bore 14.

Figure 3:
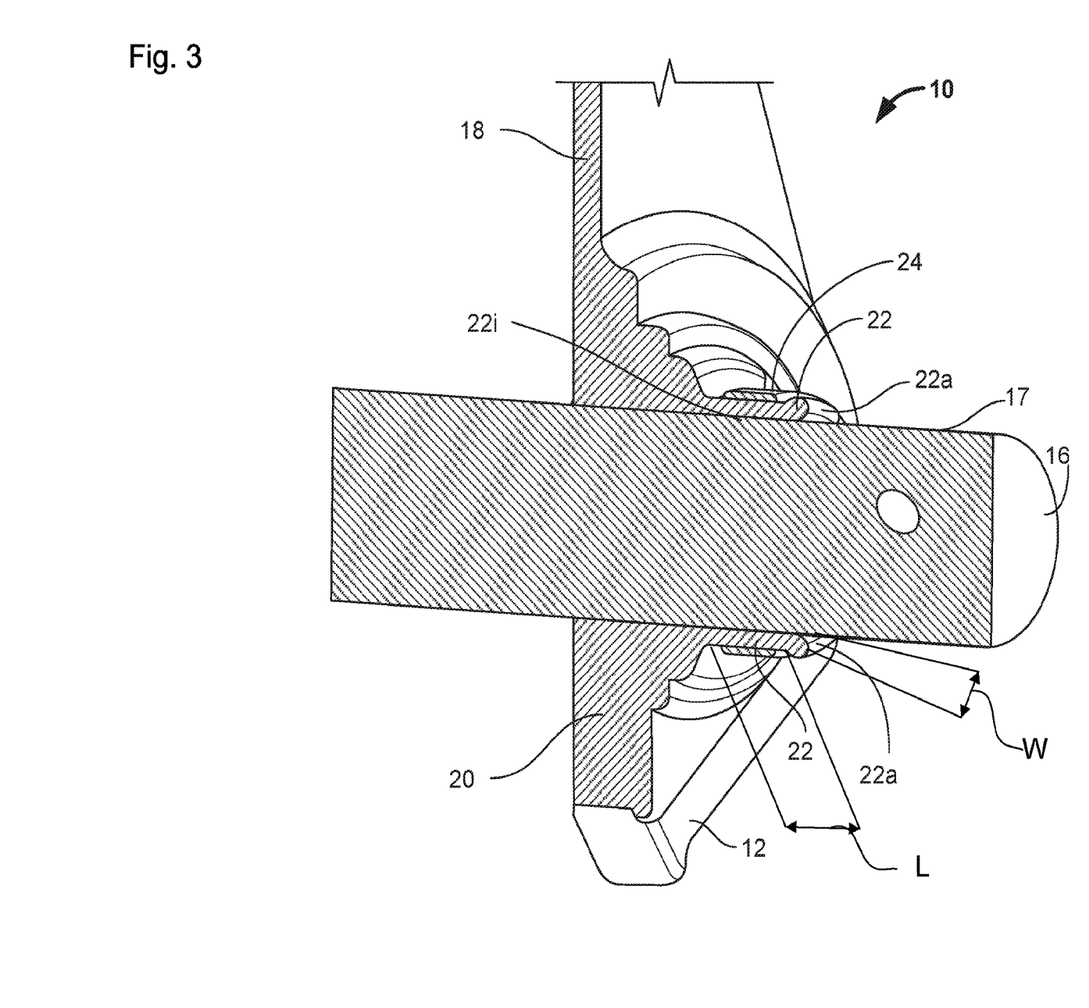
FIG. 3 is a cross section of the friction bushing with the shaft, according to certain aspects of the disclosure.
Figure 4:
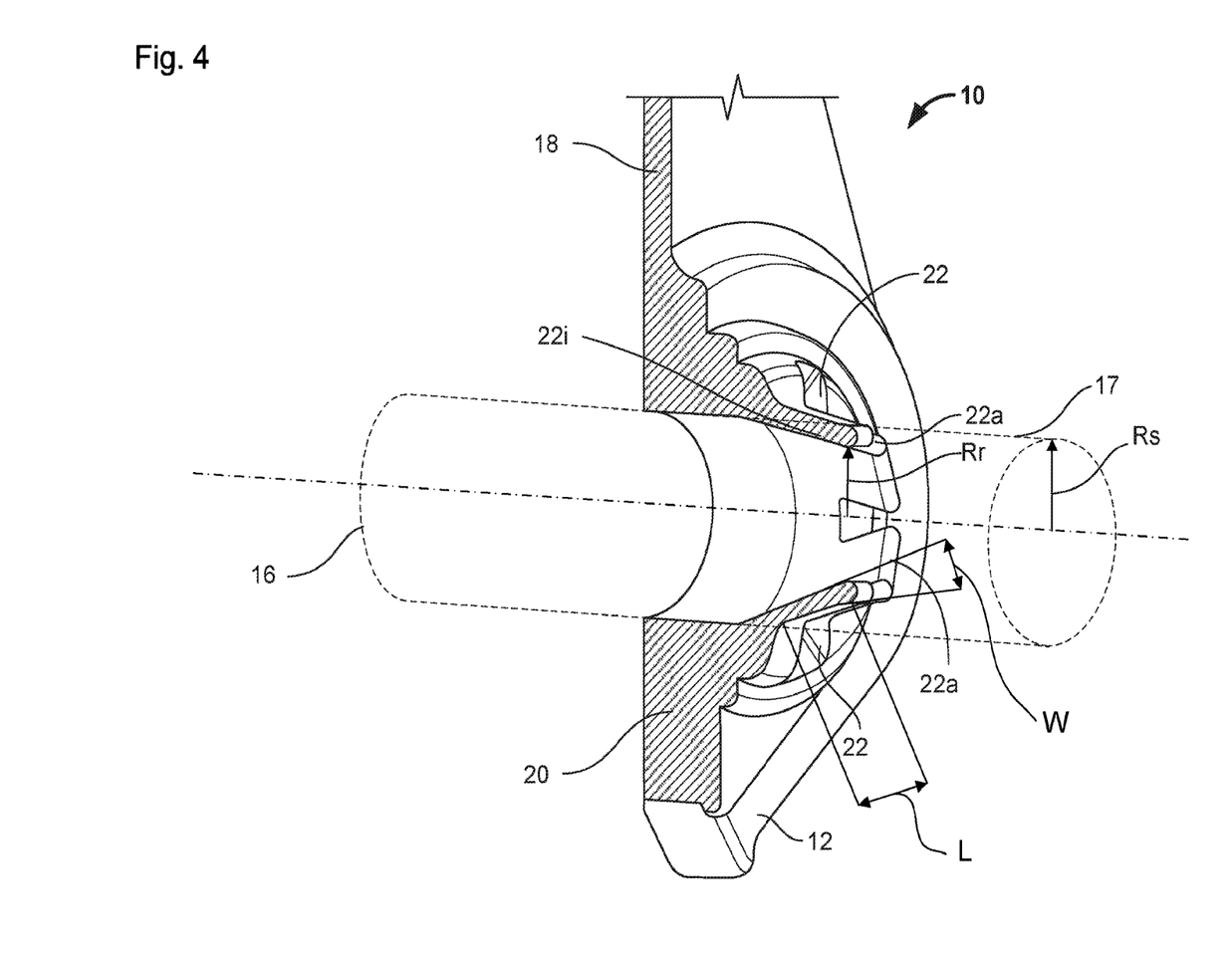
FIG. 4 is cross section of the friction bushing without the shaft, according to certain aspects of the disclosure.

The flanges 22, in some embodiments, include an internal surface 22*i* in contact with an external surface 17 of the shaft 16. The flanges 22 may be configured to be flexible from a relaxed radius Rr to a radius Rs of the shaft 16, as illustrated in FIGS. 3-4. The flexibility of the shaft 16 from the relaxed radius Rr to the radius Rs of the shaft 16, for example, can generate a radially-directed force from the internal surface 22*i* of the shaft flanges 22 to the external surface 17 of the shaft 16 that retards the rotation of the shaft 16 in the bushing 10. The degree of retardation of rotation of the shaft 16 generated by the flexibility of the flanges 22, in some implementations, is a function of a thickness W of the flanges 22, an axial length L of the flanges 22, and/or a material of the flanges 22, as illustrated in FIGS. 3-4. In addition, the degree of retardation of rotation of the shaft 16, in some implementations, is a function of surface properties, e.g. texture and roughness, of the external surface 17 of the shaft 16 and/or the internal surface 22*i* of the flanges 22.

The flanges 22 as illustrated in FIGS. 1-4 include respective enlarged terminal portions 22*a* on the outer free ends. The enlarged terminal portions 22*a*, for example, may facilitate an insertion of the shaft 16 between the flanges as the enlarged terminal portions 22*a* point in radial outer direction.

Figure 5:
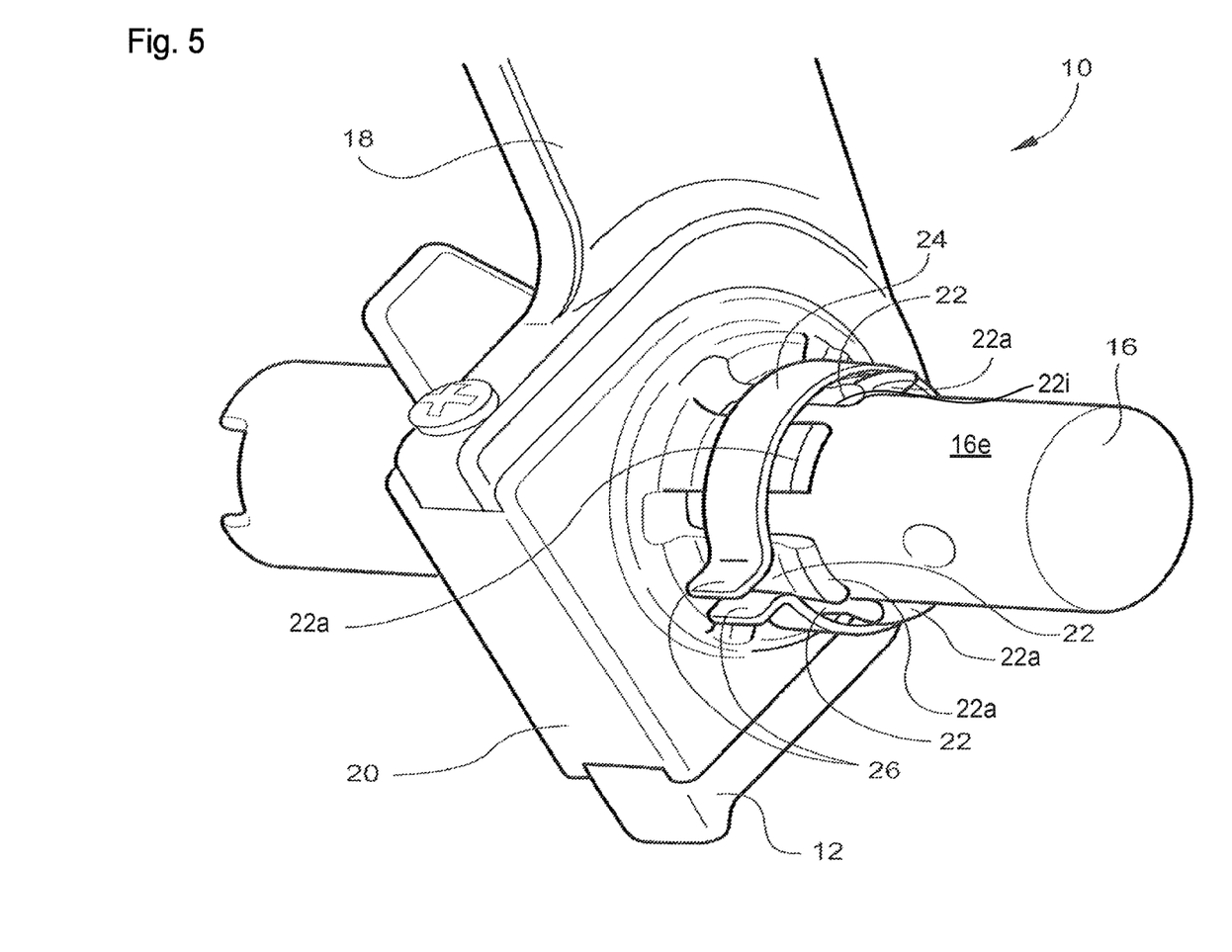
FIG. 5 is a perspective view of a friction bushing with a spring clip, according to certain aspects of the disclosure.

Referring now to FIG. 5, an annular clip 24 is shown installed over the flanges 22. The clip 24, in some embodiments, is provided to exert on the flanges 22 and on the internal surface 22i of the flanges 22 a supplementary radially-directed force to increase the degree of retardation of rotation of the shaft 16. The size of the clip 24, its material, and/or its surface finish may determine the degree of additional frictional resistance provided by the clip 24. The clip 24, in one example, may be installed over an end of the shaft 16. In another example, the clip 24 can be spread and installed radially from a side over the flanges 22. The enlarged terminal portions 22a of the flanges 22, in some implementations, are designed to aid in preventing the clip 24 from sliding off of the ends of the flanges 22. A pair of outwardly projecting ears 26 can be provided, in some implementations, to assist in manipulating the clip 24 onto the flanges 22.

Figure 6:
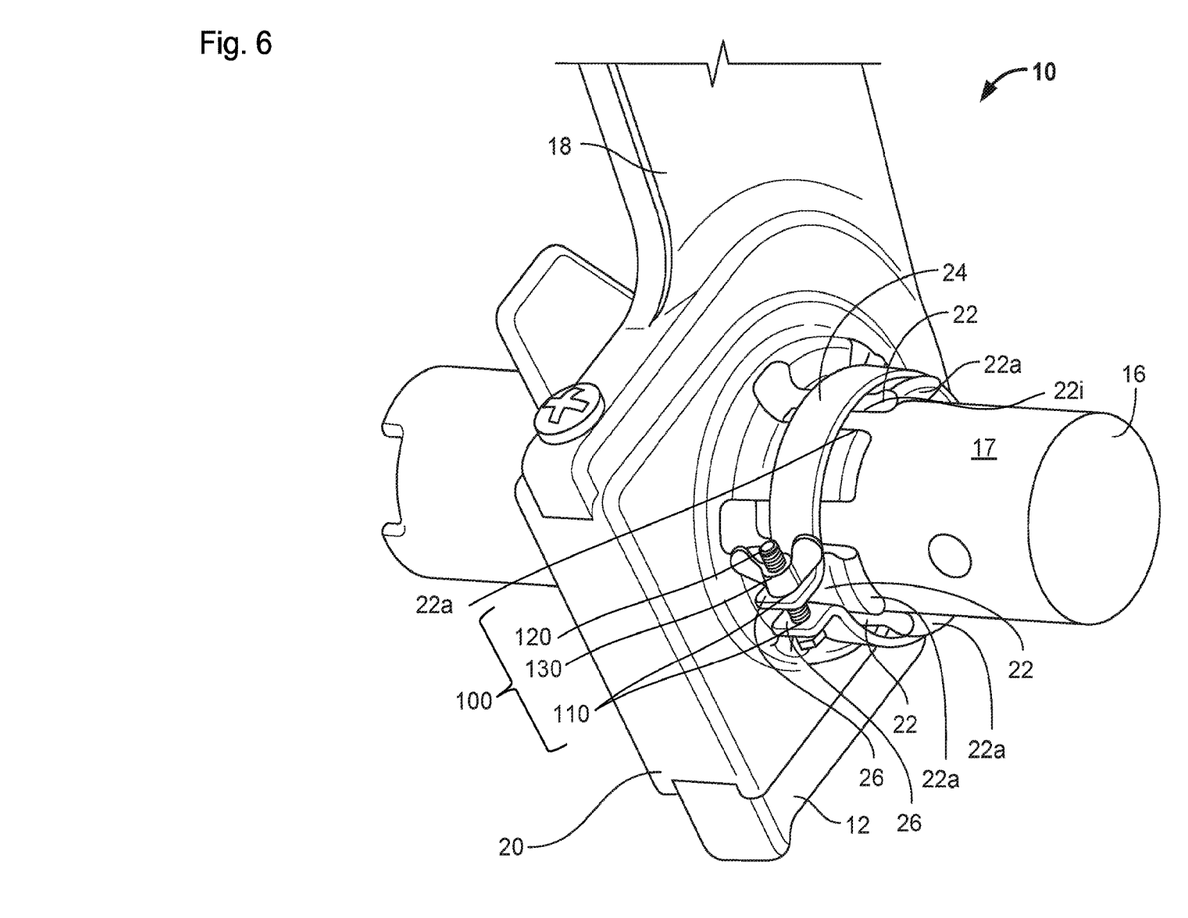
FIG. 6 is a perspective view of a friction bushing with a tensioner mounted on the spring clip, according to certain aspects of the disclosure.

Referring now to FIG. 6, the clip 24, in some embodiments, includes a tensioner 100 that passes through the ears 26 of the clip 24, via a pair of ear holes 110, to adjust the supplementary radially-directed force exerted by the clip 24 on the flanges 22 and consequently adjust the degree of retardation of rotation of the shaft 16. The tensioner 100 can include a threaded rod 120 to be inserted in the pair of ear holes 110 and a manually adjustable nut 130, e.g. a wing nut, a thumb nut, a handle nut, or the like, that can be screwed on the threaded rod 120 to press the ears 26 against each other and force the clip 24 against the flanges 22 and increase the supplementary radially-directed force from exerted on the shaft 16 by the internal surface 22i of the flanges 22. In some implementations, the adjustable nut 130 can be manually operated by the user without tool to provide a manual adjustment of the tensioner 100.

In other implementations, rather than relying on a threaded rod and a manually adjustable nut, the tensioner 100 can be a fastening device, a clamping device, and/or a tightening device. For example, the fastening device can be a screw that is tightened via a tool to provide a permanent and predetermined degree of retardation of rotation of the shaft 16 and to prevent a passenger from altering the degree of retardation.

In another example, the clamping device can be a C-clamp, to provide a stronger degree of retardation of rotation of the shaft 16. For example, a C-clamp may be preferable for use with larger bushings that articulate larger seat components, such as seat backs or leg rests.

In another example, the tightening device can be a metal wire to provide a smooth and discrete finish around the clip 24 thus preventing snagging or damage to other seat components and/or passenger belongings.

Figure 7:
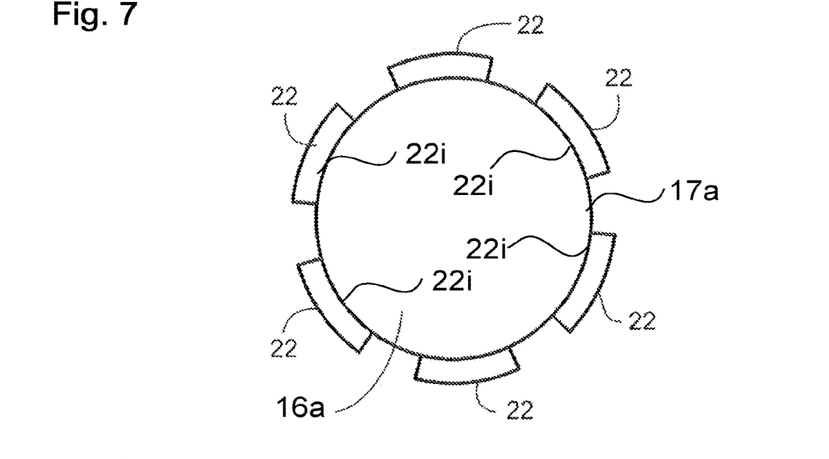
FIG. 7 is a schematic end view of a shaft without surface texture inserted in the friction bushing, according to certain aspects of the disclosure.
Figure 8:
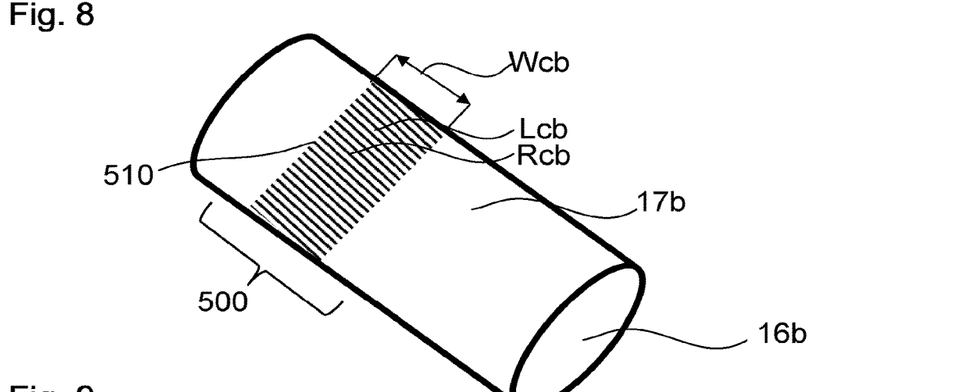
FIG. 8 is a schematic perspective view of a shaft with a circumferential texture band, according to certain aspects of the disclosure.
Figure 9:
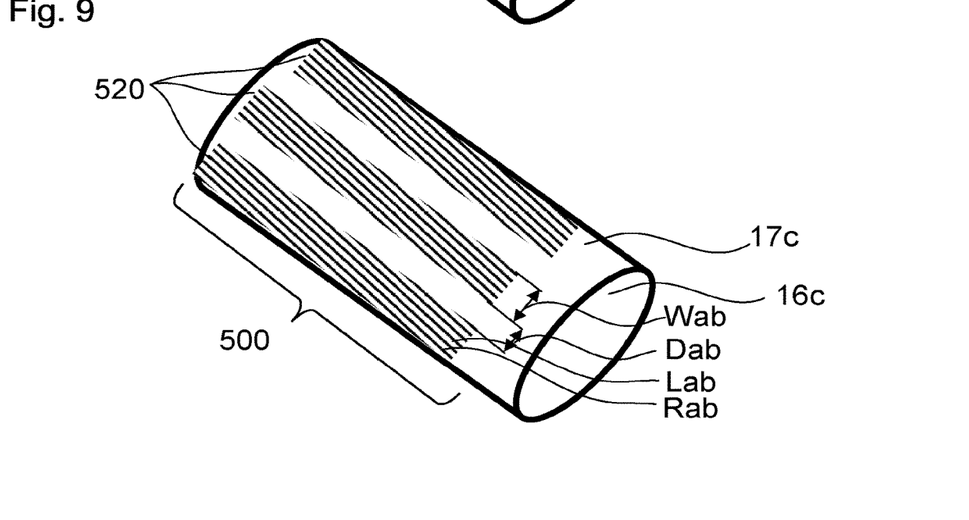
FIG. 9 is a schematic perspective view of a shaft with a series of axial texture bands, according to certain aspects of the disclosure.
Figure 10:
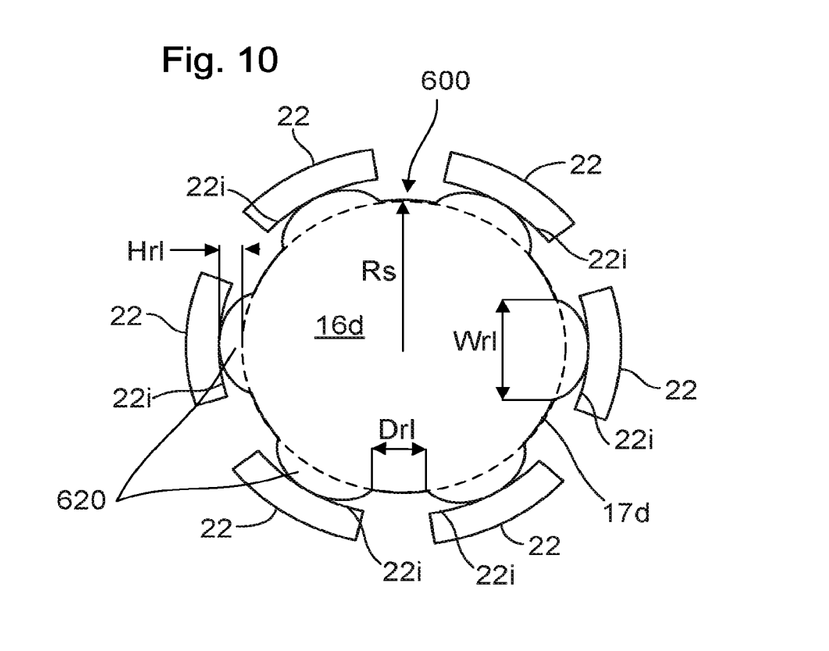
FIG. 10 is a schematic end view of the shaft with a series of regular lobes inserted in the friction bushing, according to certain aspects of the disclosure.
Figure 11:
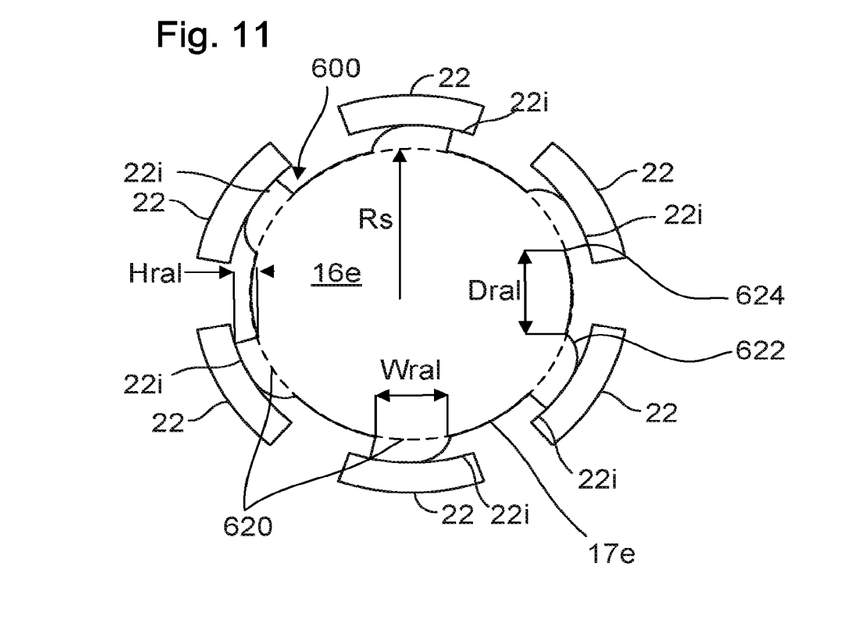
FIG. 11 is a schematic end view of the shaft with a series of ratchet lobes, according to certain aspects of the disclosure.

Referring now to FIGS. 7-12, the friction bushing 10 illustrates different shafts 16a-16f with different shaft external surfaces 17a-17f to provide different resistance behaviors for the degree of retardation as the shafts 16a-16f are rotated in the bushing 10. The different resistance behaviors can be a constant resistance behavior as illustrated in FIG. 7 with the shaft 16a and the external surface 17a; an increased resistance behavior as illustrated in FIG. 8 with the shaft 16b and the external surface 17b; a varying resistance behavior as illustrated in FIG. 9 with the shaft 16c and the external surface 17c; an incremental resistance behavior as illustrated in FIG. 10 with the shaft 16d and the external surface 17d; and/or a unidirectional resistance behavior as illustrated in FIG. 11 with the shaft 16e and the external surface 17e. Differing resistance behaviors, for example, may be selected to better suit the needs of the intended use a component such as a meal tray, a leg rest, and/or an overhead storage bin, affixed to the friction bushing 10 of the shafts 16a-16f. In some examples, a constant resistance behavior of the degree of retardation can be suitable to articulate and position the component in a multitude of different ways, the increased resistance behavior can be suitable to precisely position the component, the varying resistance behavior of the degree of retardation can be suitable to articulate and adjust the component in preselected regions, the incremental resistance behavior can be suitable to precisely position and lock the component into preselected positions, and the unidirectional resistance behavior can be suitable to prevent users from articulating the component in an undesirable direction.

Referring now to FIG. 7, in some embodiments, the shaft 16a of the friction bushing 10 is designed for providing constant resistance behavior and consequently a constant degree of retardation of rotation.

For example to provide the constant resistance behavior the external surface 17a of the shaft 16a can be substantially smooth, e.g. without texture, and the external surface 17a of the shaft 16a has a substantially flat topology, e.g. the radius Rs of the shaft 16a is substantially constant around a circumference of the shaft 16a.

Referring now to FIGS. 8-9, in some embodiments, the external surfaces 17b, 17c of the shafts 16b, 16c are designed to provide the increased resistance behavior and the varying resistance behavior, respectively. For example, the external surfaces 17b, 17c can include shaft textures 500 to increase and vary the degree of retardation.

An increase of the degree of retardation can provide more resistance when the shaft 16b is rotated in the friction bushing 10 and a better precision in positioning the component attached to the friction bushing 10 while a variation of the degree of retardation can provide sections with higher or lower resistances when the shaft 16c is rotated in the friction bushing 10 to facilitate an user in selected a preselected regions and fine tune a position in one of the preselected region.

In some implementations, as illustrated in FIG. 8, the shaft texture 500 can include a circumferential texture band 510 that is evenly applied around of the external surface 17b of shaft 16b to be in substantially constant contact with the internal surface 22i of the flanges 22. The circumferential texture band 510, for example, may provide a constant rotational movement of the shaft 16b under a constant friction level so that, in use, a person moving the part including the friction bushing joint, the person experiences a substantially uniform smoothness of movement between positions.

The circumferential texture band 510, in some embodiments, can be characterized by a predetermined circumferential band thickness Wcb, a predetermined circumferential band lay Lcb, and a predetermined circumferential band roughness Rcb to provide a predetermined level of increased resistance of the rotation of the shaft 16 sufficiently high to prevent the component including the rotational joint to rotate around the shaft 16 inadvertently, e.g. by the own weight of the component, but sufficiently low to be rotated around the shaft 16b under the action the user. For example, the predetermined circumferential band thickness Wcb can be between 10% and 110% of the axial length L of the flanges 22, the predetermined circumferential band lay Lcb can be substantially aligned with an axial direction of the shaft 16b, and the predetermined circumferential band roughness Rcb can be between 0.05 μm and 50 μm.

In some embodiments, the shaft texture 500 includes a series of axial texture bands 520 regularly spaced around the external surface 17c of the shaft 16c to be alternatively in contact with the internal surface 22i of the flanges 22 as the shaft 16c is rotated, as illustrated in FIG. 9. The series of axial texture bands 520, for example, may provide an alternative rotational movement of the shaft 16c composed of alternative frictional variations so as the user can repeatedly move the component carried on the shaft 16c between a series of preselected regions. The alternative frictional variations may correspond to regions of high and low resistances and the preselected regions for fine tuning can be indicated by the regions of high resistances. The preselected regions may correspond to positions often used by the passengers e.g. positions where a meal tray is used to support items, or where a leg rest is used to support legs of a passenger.

The series of axial texture bands 520, in some embodiments, can be characterized by a predetermined axial band thickness Wab, a predetermined axial band inter distance Dab, a predetermined axial band lay Lab, and a predetermined axial band roughness Rab to provide a predetermined level of increased resistance of the rotation of the shaft 16 sufficiently high to prevent the component to rotate around the shaft 16 inadvertently, e.g. by the own weight of the component, but sufficient low to be rotated around the shaft 16c under the action the user. For example, the predetermined axial band thickness Wab can be between 10% and 110% of an axial length L of the flanges 22, the axial band inter-distance Dab can be between 10% and 110% of the axial length L of the flanges 22, the predetermined axial band lay Lab can be substantially aligned with an axial direction of the shaft 16c, and the predetermined axial band roughness Rab can be between 0.05 µm and 50 µm.

Figure 12:
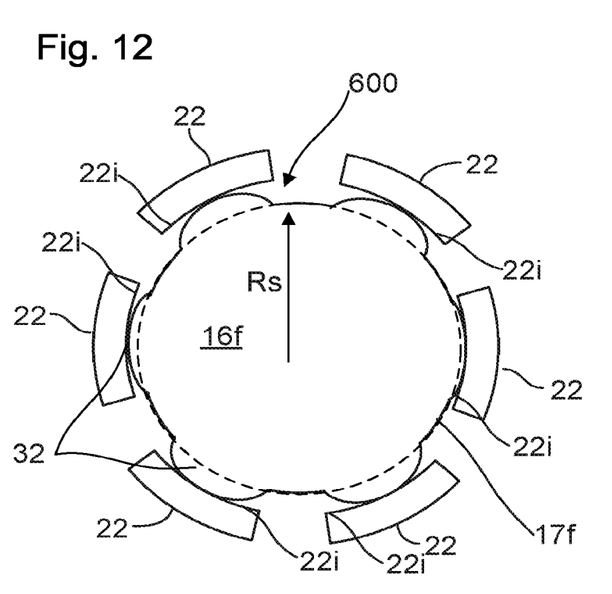
FIG. 12 is a schematic end view of the shaft with a series irregular lobes, according to certain aspects of the disclosure.

Referring now to FIGS. 10-12, in some embodiments, the external surfaces 17d, 17e of the shafts 16d, 16e are designed to provide incremental resistance behavior and unidirectional resistance behavior, respectively. For example, the external surfaces 17d, 17e can include ridged or waved shaft topologies 600 to increase the resistance by incremental steps and to increase resistance in a single direction.

An increase of the degree of retardation by incremental steps can provide an indexed articulation to lock the component onto preselected positions while an increase of the degree of retardation in a single direction can prevent a user (or other external force) in inadvertently articulating the component in an undesirable direction. For example, incremental step resistance can aid in maintaining the position of a tray table holding considerable weight such as a laptop computer despite dynamic forces applied to the friction bushing of the tray table due to turbulence.

In some embodiments, the shaft topology 600 includes a series of regular lobes 610 regularly spaced around a circumference of the external surface 17d of the shaft 16d to provide a rotational movement composed of regular incremental steps so as the user can repeatedly move the aircraft component carried on the shaft 16d to a series of preselected positions, as illustrated in FIG. 10. Each of the flanges 22, in the illustrated example, may warp slightly, ride up over the series of regular lobes 610 and settle into the circumferential areas of the shaft 16d between two consecutive lobes of the series of regular lobes 610.

The series of regular lobes 610, in some embodiments, can be characterized by a predetermined regular lobe width Wrl, a predetermined regular lobe height Hrl, a predetermined inter regular lobe distance Drl, and a predetermined regular lobe number Nrl to provide a predetermined level of increased resistance of the rotation of the shaft 16d sufficiently high to prevent the aircraft component to rotate around the shaft 16 inadvertently, e.g. by the own weight of the aircraft component, but sufficient low to be rotated around the shaft 16 under the action the user. For example, the predetermined regular lobe width Wrl can be between be between 10% and 110% of the difference between the relaxed radius Rr and the radius Rs, the predetermined regular lobes height Hrl can be between 50% and 80% of the radius Rs of the shaft 16d, a predetermined inter regular lobe distance Drl can be between 50% and 80% of the radius Rs of the shaft 16d, and a predetermined regular lobe number Nrl can be between 4 and 8.

In other embodiments, the shaft topology 600 can include a series of ratchet lobes 620 regularly spaced around a circumference of the external surface 17e of the shaft 16e to provide a unique direction of rotation so as to prevent the user to rotate the shaft in an unwanted direction, as illustrated in FIG. 11. Each ratchet lobe 620 can include a rounded portion 622, for example to facilitate a passage of the flanges 22 over the ratchet lobe 610, and a flat portion 624, for example to prevent the passage of the flanges 22 over the ratchet lobe 610.

The series of ratchet lobes 620, in some embodiments, can be characterized by a predetermined ratchet lobe width Wral, a predetermined ratchet lobe height Hral, a predetermined inter ratchet lobe distance Dral, and a predetermined ratchet lobe number Nral to provide a predetermined level of increased resistance of the rotation of the shaft 16e sufficiently high to prevent the aircraft seat component to rotate around the shaft 16 inadvertently, e.g. by the own weight of the aircraft seat component, but sufficient low to be rotated around the shaft 16e under the action the user. For example, the predetermined ratchet lobe width Wral can be between 10% and 110% of the difference between the relaxed radius Rr and the radius Rs, the predetermined ratchet lobe height Hral can be between 50% and 80% of the radius Rs of the shaft, the predetermined inter ratchet lobe distance Dral can be between 50% and 80% of the radius Rs of the shaft 16e, and a predetermined ratchet lobe number Nral can be between 4 and 8.

In further embodiments, the shaft topology 600 includes a series of irregular lobes 32 protruding radially and extending axially along a circumference of an external surface 17f of a shaft 16f, as illustrated in FIG. 12. The series of irregular lobes 32, for example, can be composed of different shapes and sizes that can be distributed along a circumference of the shaft 30. The different shapes and sizes, in some implementations, are presented in series. In other implementations, the different shapes and sizes are random. The irregular lobes 32, for example, may provide a variation of the resistance that does not follow any particular pattern.

According to one preferred embodiment of the disclosure, a friction bushing has six (6) flanges 22. While the flanges 22 may be provided with widths and lengths suitable for any particular need, according to one preferred embodiment, the flanges 22 collectively constitute two-thirds of the circumference of the bore 14 and spaces between the flanges 22 constitute one third of the circumference of the bore 14. According to one preferred embodiment, the enlarged terminal portions 22a constitute the outer 25 percent of the length of the flanges 22.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

What is claimed is:

1. A friction bushing to provide resistance to a rotating shaft, comprising:
   a housing having a bore to receive the shaft;
   a flange plate positioned on the housing around the bore; and
   a plurality of flanges that protrudes axially from the flange plate to receive the shaft, wherein the plurality of flanges generates a radially-directed force by being flexible from a relaxed radius to a shaft radius of the shaft, the plurality of flanges has internal circumferentially spaced surfaces in contact with an external surface of the shaft having a topology to control the resistance as the shaft rotates in the friction bushing, the topology of the external surface of the shaft includes a plurality of regular lobes to control the resistance by providing regular incremental steps as the shaft rotates in the friction bushing and further wherein each regular lobe of the plurality of regular lobes has a predetermined regular lobe width between 10% and 110% of the difference between the relaxed radius and the shaft radius of the shaft; a predetermined regular lobe height between 50% and 80% of the shaft radius, a predetermined inter regular lobe distance between 50% and 80% of the shaft radius, and a predetermined regular lobe number between 4 and 8.

2. The friction bushing of claim 1, wherein the topology of the external surface of the shaft includes a plurality of ratchets to provide a unique direction of rotation for the shaft.

3. The friction bushing of claim 2, wherein each ratchet of the plurality of ratchets includes a rounded portion to facilitate a passage of the plurality of flanges and a flat portion to prevent the passage of the plurality of the flanges.

4. A friction bushing to provide resistance to a rotating shaft, comprising:
   a housing having a bore to receive the shaft;
   a flange plate positioned on the housing around the bore; and
   a plurality of flanges that protrudes axially from the flange plate to receive the shaft, wherein the plurality of flanges generates a radially-directed force by being flexible from a relaxed radius to a shaft radius of the shaft, the plurality of flanges has internal circumferentially spaced surfaces in contact with an external surface of the shaft having a topology to control the resistance as the shaft rotates in the friction bushing; the topology of the external surface of the shaft including a plurality of ratchets to provide a unique direction of rotation for the shaft, each ratchet of the plurality of ratchets includes a rounded portion to facilitate a passage of the plurality of flanges and a flat portion to prevent the passage of the plurality of the flanges, and wherein each ratchet includes a predetermined ratchet lobe width between 10% and 110% of the difference between the relaxed radius and the shaft radius; a predetermined ratchet lobe height between 50% and 80% of the shaft radius; a predetermined inter ratchet lobe distance between 50% and 80% of the shaft radius; and a predetermined ratchet lobe number between 4 and 8.

5. The friction bushing of claim 4, wherein the topology of the external surface of the shaft includes a plurality of irregular lobes to control the resistance by providing irregular incremental steps as the shaft rotates in the friction bushing.

6. The friction bushing of claim 4, wherein each flange of the plurality of flange includes an enlarged terminal portion.

7. A friction bushing to rotate a shaft with resistance, comprising:
   a housing having a bore to receive the shaft;
   a flange plate positioned on the housing around the bore; and
   a plurality of flanges that protrudes axially from the flange plate to receive the shaft, wherein the plurality of flanges generates a radially-directed force by being flexible from a relaxed radius to a shaft radius of the shaft, and the plurality of flanges has internal circumferentially spaced surfaces in contact with an external surface of the shaft having a texture to control the resistance as the shaft rotates in the friction bushing; further wherein the texture of the external surface of the shaft includes a plurality of axial texture bands to control the resistance by providing alternative frictional levels as the shaft rotates in the friction bushing and further wherein each axial texture band of the plurality of axial texture bands includes a predetermined axial band thickness between 10% and 110% of an axial length of the plurality of flanges; a predetermined axial band inter distance between 10% and 110% of the axial length of the plurality of flanges, and a predetermined axial band roughness between 0.05 1 μm and 50 μm.

8. The friction bushing of claim 7, wherein the texture of the external surface of the shaft includes a circumferential band to control the resistance by providing a constant friction level as the shaft rotates in the friction bushing.

9. The friction bushing of claim 8, wherein the circumferential band includes a predetermined circumferential band thickness between 10% and 110% of an axial length of the plurality of flanges; and a predetermined circumferential band roughness between 0.05 μm and 50 μm.

10. The friction bushing of claim 7, wherein each flange of the plurality of flange includes an enlarged terminal portion.

* * * * *